(12) United States Patent
Tsutsumi et al.

(10) Patent No.: US 9,196,427 B2
(45) Date of Patent: Nov. 24, 2015

(54) WINDING-TYPE ELECTRIC STORAGE DEVICE

(75) Inventors: Masakazu Tsutsumi, Kyoto (JP); Jun Nakamura, Kyoto (JP); Takashi Suzuki, Tokyo (JP)

(73) Assignees: GS Yuasa International Ltd., Kyoto-shi, Kyoto (JP); Honda Motor Co., Ltd., Tokyo (JP)

( * ) Notice: Subject to any disclaimer, the term of this patent is extended or adjusted under 35 U.S.C. 154(b) by 534 days.

(21) Appl. No.: 13/449,212

(22) Filed: Apr. 17, 2012

(65) Prior Publication Data

US 2013/0011707 A1    Jan. 10, 2013

(30) Foreign Application Priority Data

Jul. 6, 2011   (JP) ................................. 2011-150296

(51) Int. Cl.
| | |
|---|---|
| H01M 4/00 | (2006.01) |
| H01G 4/32 | (2006.01) |
| H01G 11/82 | (2013.01) |
| H01G 11/14 | (2013.01) |
| H01G 11/74 | (2013.01) |
| H01M 10/04 | (2006.01) |
| H01M 10/0587 | (2010.01) |

(52) U.S. Cl.
CPC ............... *H01G 11/82* (2013.01); *H01G 11/14* (2013.01); *H01G 11/74* (2013.01); *H01M 10/0431* (2013.01); *H01G 4/32* (2013.01); *H01M 10/0409* (2013.01); *H01M 10/0587* (2013.01); *Y02E 60/13* (2013.01)

(58) Field of Classification Search
CPC ......... H01G 4/32; H01G 11/74; H01G 11/82; H01G 11/14; H01M 10/0587; H01M 10/0431; H01M 10/0409; H01M 2006/50; B65H 75/02; B65H 54/14; B65H 75/06; B65H 75/08; B65H 75/26
USPC .......................................... 429/94; 361/301.5
See application file for complete search history.

(56) References Cited

U.S. PATENT DOCUMENTS

| | | | | |
|---|---|---|---|---|
| 3,093,332 | A * | 6/1963 | Jackson | 242/486.8 |
| 3,917,185 | A * | 11/1975 | Canada et al. | 242/610.6 |
| 5,947,409 | A * | 9/1999 | Corrigan, Jr. | 242/571.4 |
| 6,485,859 | B1 * | 11/2002 | Szyszkowski | 429/66 |
| 6,866,222 | B2 * | 3/2005 | Varela | 242/571.4 |
| 2011/0287293 | A1 * | 11/2011 | Suzuki et al. | 429/94 |

FOREIGN PATENT DOCUMENTS

| | | | |
|---|---|---|---|
| JP | 2003-242970 A | 8/2003 | |
| JP | 2003-346879 A | 12/2003 | |
| WO | WO2010/087384 A1 | 8/2010 | |
| WO | WO 2010087384 * | 8/2010 | ............ H01M 10/04 |

* cited by examiner

*Primary Examiner* — Milton I Cano
*Assistant Examiner* — Michael Dignan
(74) *Attorney, Agent, or Firm* — McGinn IP Law Group, PLLC

(57) ABSTRACT

A winding-type electric storage device may prevent swaying or movement of an electrode assembly. The winding-type electric storage device includes a flat electrode assembly, which includes a core, and a case in which the electrode assembly is housed, the core including first and second curved sections which are disposed so that the inner circumferential surfaces thereof face to each other, and each of which is at least in part composed of a material stacked into two or more plies, and first and second opposed sections which connect the mutually-opposed first ends and second ends of the first and second curved sections to each other.

23 Claims, 8 Drawing Sheets

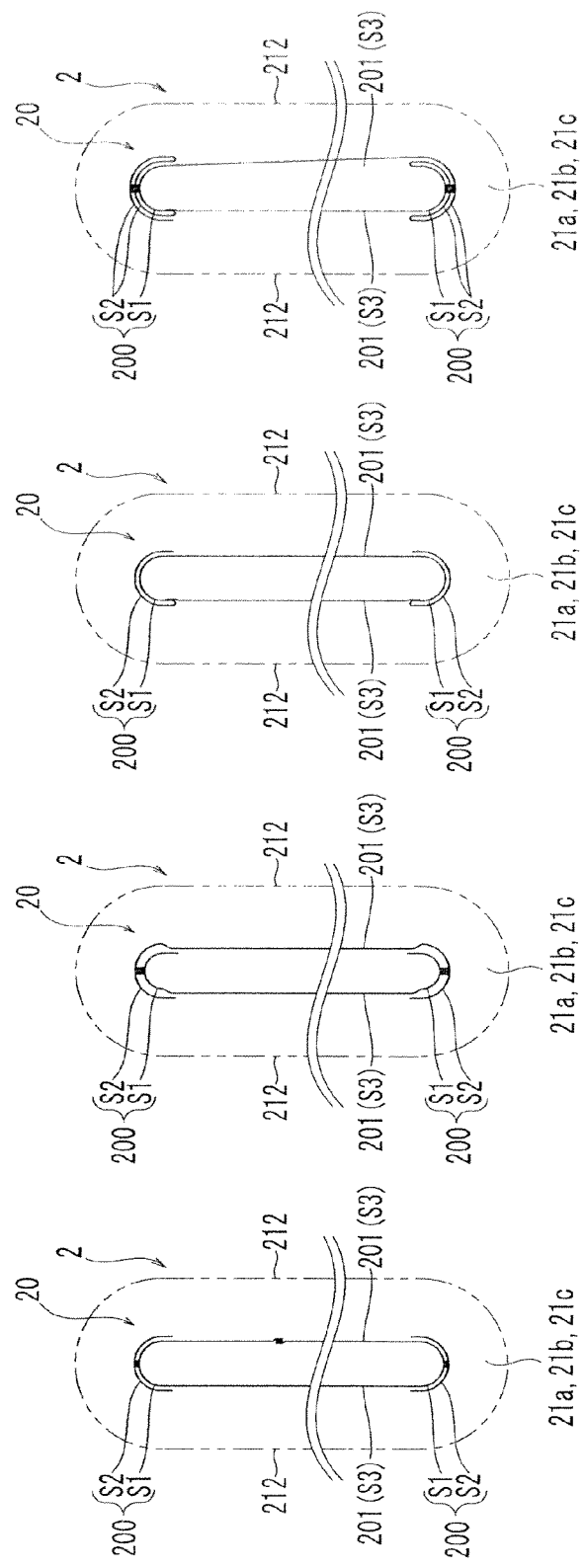

WINDING-TYPE ELECTRIC STORAGE DEVICE

CROSS-REFERENCE TO RELATED APPLICATION

This application claims priority from Japanese Patent Application No. 2011-150296, the disclosure of which is incorporated herein by reference in its entirety.

FIELD OF THE INVENTION

The present invention relates to a winding-type electric storage device provided with an electrode assembly in which a positive electrode plate and a negative electrode plate are wound around a core.

BACKGROUND ART

Conventionally, a winding-type electric storage device has been provided as one of electric storage devices employed in power supplies of various types of equipment and the like. The winding-type electric storage device is provided with an electrode assembly in which a positive electrode plate and a negative electrode plate are wound around a core, current collectors electrically connected to the electrode assembly, and a case in which the electrode assembly and the current collectors are housed.

The electrode assembly is formed into a flat shape. Accordingly, the electrode assembly includes a substantially plane section on an outer circumference thereof. A resin sheet having flexibility formed into a cylindrical shape is employed as the core. The core is formed into a flat cylindrical shape according to the external shape of the electrode assembly (cf., for example, Japanese Patent Laid-Open No. 2003-242970).

A positive-electrode lead portion is formed in a first end portion of the electrode assembly, and a negative-electrode lead portion is formed in a second end portion of the electrode assembly. A current collector fixed onto an inner surface of the case is connected to each lead portion. The electrode assembly is supported inside the case by the current collectors. The substantially plane section of the electrode assembly is in proximity to or contact with the inner surface of the case.

As described above, the electrode assembly is restrained in both a winding-center direction and a direction orthogonal to the winding center direction. Accordingly, it is possible to prevent swaying or movement of the electrode assembly which can be a cause for breakage or damage of the electrode assembly and the like.

In the winding-type electric storage device configured as described above, however, the positive and negative electrode plates may be pushed toward a flat direction if excessive vibration or impact is applied. That is, if excessive vibration or impact is applied, the core may fail to withstand the vibration or impact, since a resin sheet formed into a cylindrical shape is employed as the core. Thus, the electrode assembly as a whole may become compressively deformed in the flat direction. In that case, a gap is formed between the substantially plane section of the electrode assembly and the inner surface of the case. If a gap is present therebetween, the electrode assembly as a whole may sway or move inside the case and may become damaged.

SUMMARY OF THE INVENTION

Hence, an object of the present invention is to provide a winding-type electric storage device capable of preventing swaying or movement of an electrode assembly, in view of such circumstances as described above.

According to the present invention, there is provided a winding-type electric storage device, which includes:
a flat electrode assembly including a core; and
a case in which the electrode assembly is housed,
the core including:
first and second curved sections which are disposed so that the inner circumferential surfaces thereof face to each other and each of which has a first end and a second end; and
first and second opposed sections which connect the mutually-opposed first ends and second ends of the first and second curved sections to each other and are opposed to each other,
the electrode assembly including, on the outer circumference thereof, substantially plane sections respectively corresponding to the opposed sections of the core,
the substantially plane sections being in proximity o or contact with an inner surface of the case,
wherein each of the first and second curved sections is at least in part composed of a material stacked into two or more plies.

BRIEF DESCRIPTION OF THE DRAWINGS

FIGS. 7A to 7D are schematic side views of various modified examples of the core according to another embodiment of the present invention.

DETAILED DESCRIPTION OF THE PREFERRED EMBODIMENTS

Hereinafter, a winding-type battery cell (hereinafter simply referred to as "battery cell") which is one embodiment of a winding-type electric storage device according to the present invention will be described with reference to the accompanying drawings. Note that in the present embodiment, one of two elements forming a pair or one of two portions forming a pair is expressed as "first," and the other one thereof is expressed as "second."

Figure 1:
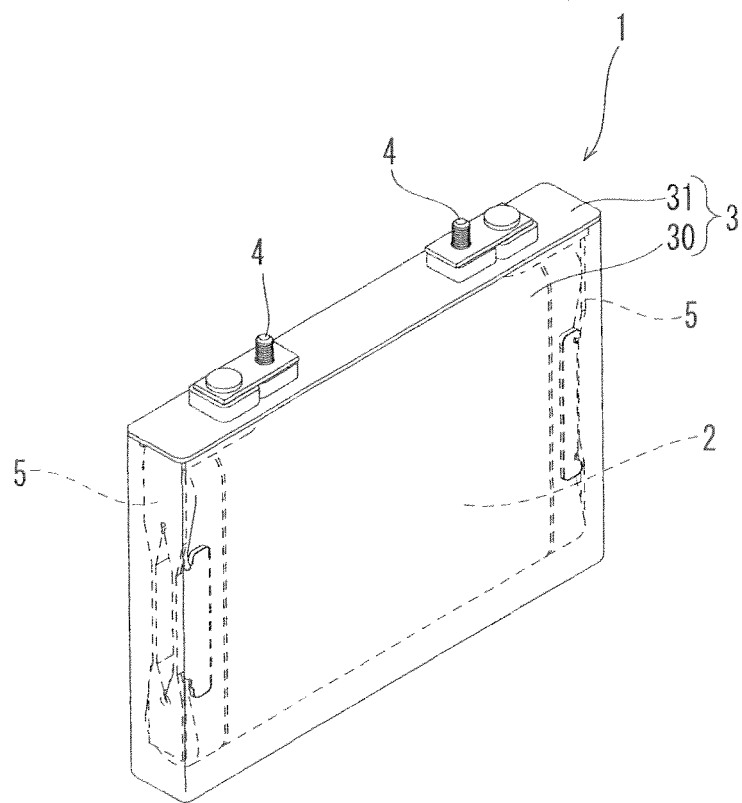
FIG. 1 is an overall perspective view of a winding-type battery cell according to one embodiment of the present invention.
Figure 2:
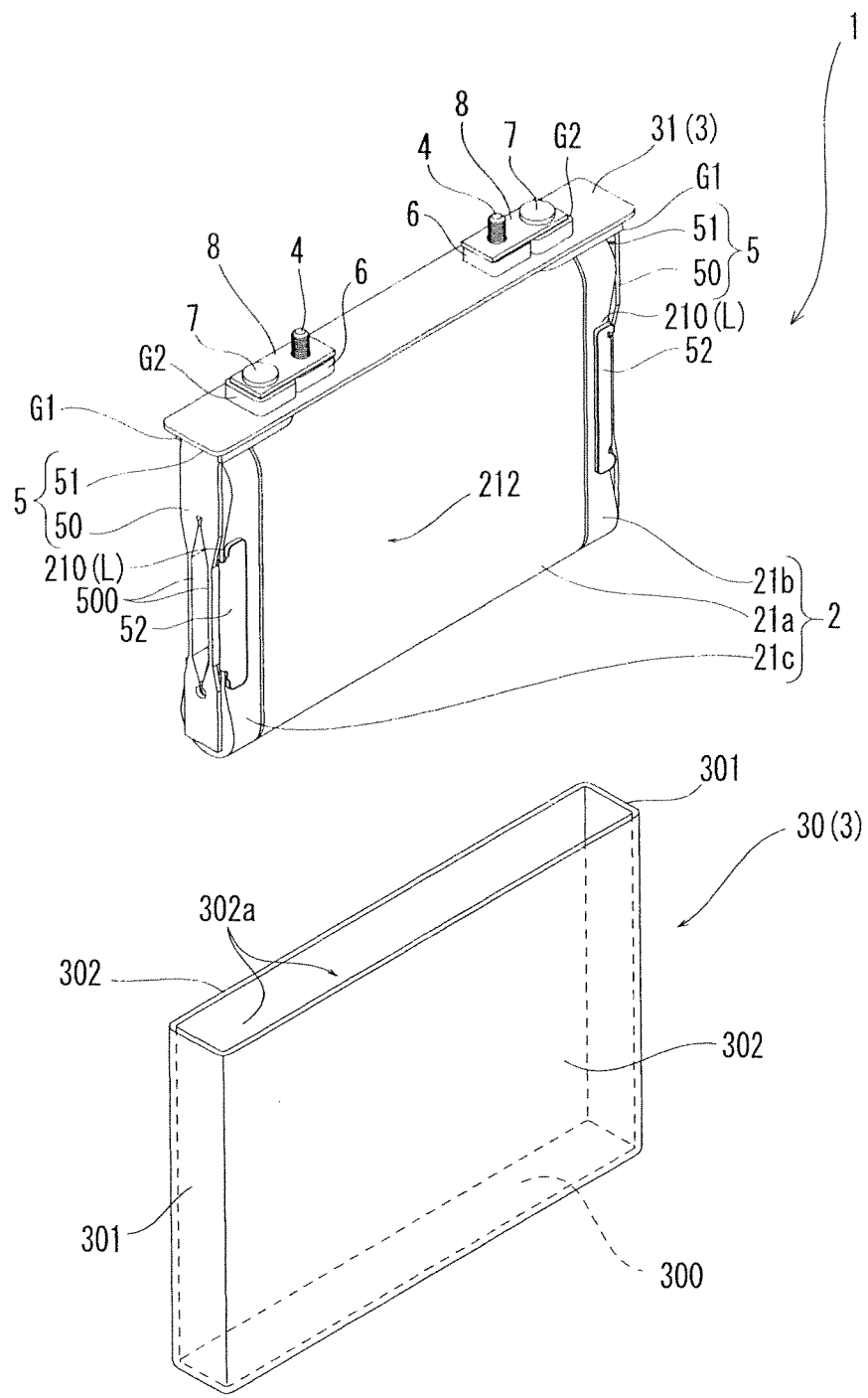
FIG. 2 is a partially exploded perspective view of the winding-type battery cell.
Figure 3:
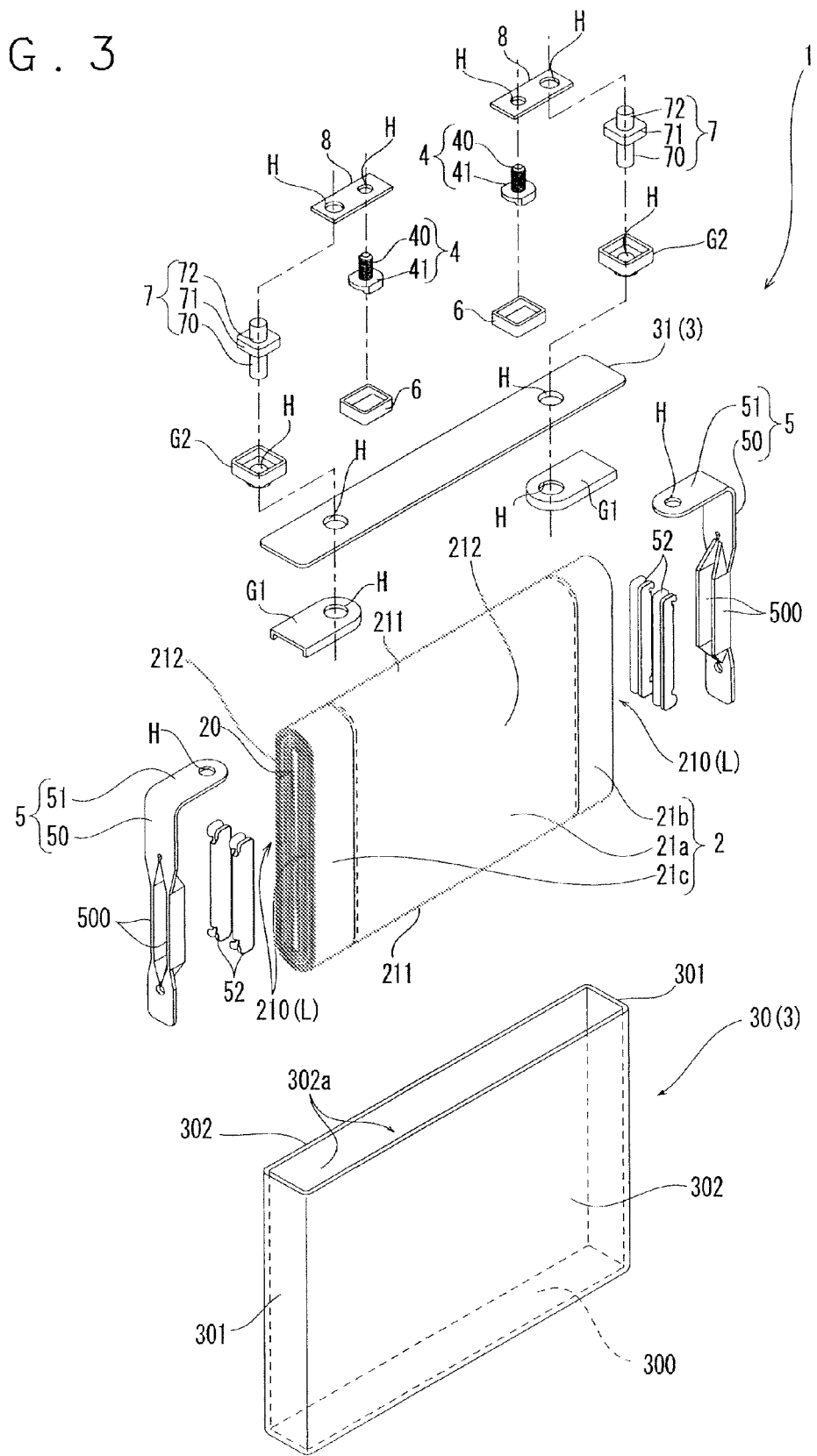
FIG. 3 is an exploded perspective view of the winding-type battery cell.

As illustrated in FIGS. 1 to 3, the battery cell is provided with an electrode assembly 2 for generating electric power; a case 3 in which the electrode assembly 2 is housed; output terminals 4, 4 disposed outside the case 3; and current collectors 5, 5 for electrically connecting the electrode assembly 2 and the output terminals 4, 4.

Figure 4A:
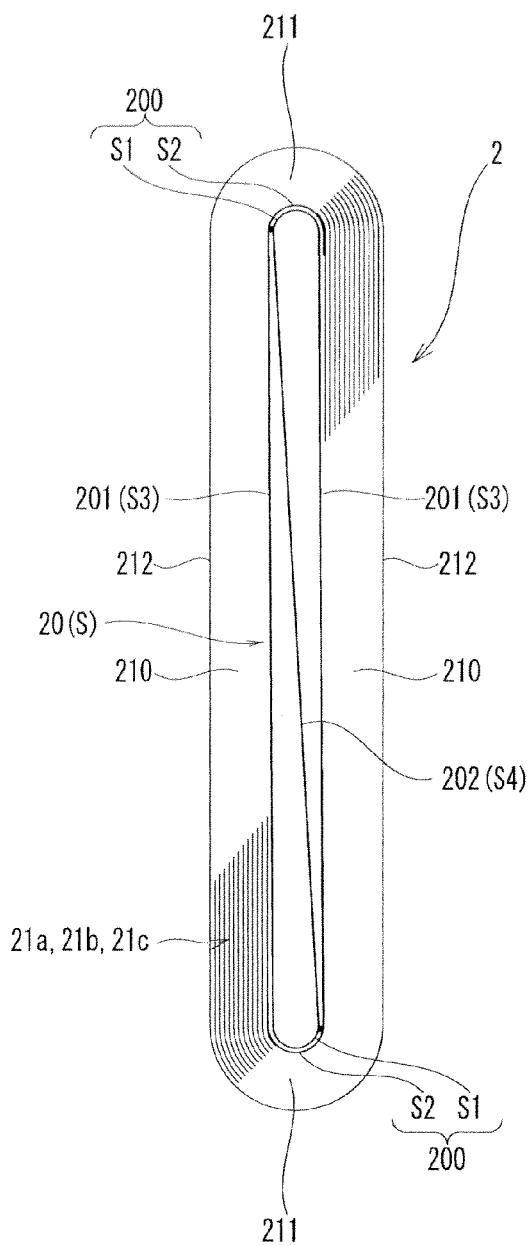
FIG. 4A is a side view of an electrode assembly.

As illustrated in FIG. 4A, the electrode assembly 2 includes a core 20, and a positive electrode plate 21b and a negative electrode plate 21c stacked with a separator 21a held therebetween and wound around the core 20.

The core 20 is formed of a resin sheet thicker than the separator 21a. The core 20 is composed of a resin sheet, such as PP, PE, PPS or PET, resistant to an electrolytic solution.

The thickness of the resin sheet to be formed into the core 20 is set to 50 to 200 μm. The core 20 according to the present embodiment is composed of a resin sheet made of PP and set to 150 μm in thickness.

The core 20 includes a pair of curved sections 200, 200 disposed with the inner circumferential surfaces thereof facing to each other, and a pair of opposed sections 201, 201 which connect the mutually-opposed first ends and second ends of the pair of curved sections 200, 200 to each other and are opposed to each other.

The pair of curved sections 200, 200 is arranged in mirror image while being spaced from each other in one direction. At least part of each curved section 200 is composed of at least two-ply resin sheets S1 and S2. In the present embodiment, each curved section 200 is composed of at least two-ply resin sheets S1 and S2 curved in a circular arc shape over a distance from the first end to the second end. Each opposed section 201 is composed of a resin sheet S3.

The core 20 is further provided with a connecting section 202 for connecting the first end of the first curved section 200 and the second end of the second curved section 200. The connecting section 202 is composed of a resin sheet S4.

The first opposed section 201 connects a first end of the outer resin sheet S2 in the first curved section 200 and a first end of the inner resin sheet S1 in the second curved section 200. The second opposed section 201 connects a second end of the inner resin sheet S1 in the first curved section 200 and a second end of the outer resin sheet S2 in the second curved section 200. The connecting section 202 connects the first end of the inner resin sheet S1 in the first curved section 200 and the second end of the inner resin sheet S1 in the second curved section 200.

The curved sections 200, 200, the opposed sections 201, 201 and the connecting section 202 are formed continuously. That is, the outer resin sheet S2 in the first curved section 200, the resin sheet 83 composing the first opposed section 201, the inner resin sheet S1 in the second curved section 200, the resin sheet S4 composing the connecting section 202, the inner resin sheet S1 in the first curved section 200, the resin sheet S3 composing the second opposed section 201, and the outer resin sheet S2 in the second curved section 200 are formed while being linked to one another in this order.

The core 20 is formed by curving a resin sheet S at a plurality of places thereof. The curved sections 200, 200, the opposed sections 201, 201 and the connecting section 202 are formed of the resin sheet S. The core 20 is fabricated by arranging the resin sheet S, so that a first end side and a second end side thereof curved into an S-shape respectively overlap with the outer sides of the curved portions of the S-shape (portions to be formed into the inner resin sheet S1 in the curved section 200).

A boundary, or a vicinity thereof, between the inner resin sheet S1 in the first curved section 200 and the connecting section 202 is welded to a boundary, or a vicinity thereof, between the first opposed section 201 and the outer resin sheet 82 in the first curved section 200. Likewise, a boundary, or a vicinity thereof, between the inner resin sheet S1 in the second curved section 200 and the connecting section 202 is welded to a boundary, or a vicinity thereof, between the second opposed section 201 and the outer resin sheet S2 in the second curved section 200. That is, a first end portion of the outer resin sheet S2 in the first curved section 200 and a first end portion of the inner resin sheet S1 in the first curved section 200 are thermally welded to each other. Likewise, a second end portion of the outer resin sheet S2 in the second curved section 200 and a second end portion of the inner resin sheet S1 in the second curved section 200 are thermally welded to each other.

Figure 4B:
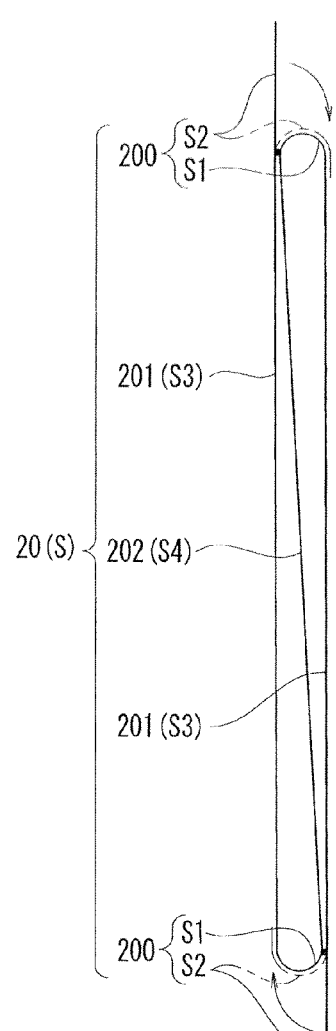
FIG. 4B is a side view of a core.

Consequently, as illustrated in FIG. 4B, the inner resin sheet S1 in each curved section 200 maintains a state of being curved into a circular arc shape, while generating a repulsive force. In contrast, in each curved section 200, one of the first end and the second end of the outer resin sheet S2 is fixed, whereas the other one of the first end and the second end is a free end. That is, the outer resin sheet S2 is a slat. Accordingly, the outer resin sheet S2 generates such a repulsive force (restoring force) as to cause the resin sheet to attempt to extend in a tangential direction. That is, the outer resin sheet S2 maintains a state of being straightened out along with the opposed sections 201, 201, until the positive electrode plate 21b and the negative electrode plate 21c are wound around the outer resin sheet S2. As the positive electrode plate 21b and the negative electrode plate 21c are wound around the resin sheet S2, the resin sheet S2 forms into a circular arc shape along the inner resin sheet S1.

The electrode assembly 2 is formed into a flat shape, as illustrated in FIG. 4A, as the result of the positive electrode plate 21b and the negative electrode plate 21c being wound around the core 20. That is, the electrode assembly 2 is formed so that the outer size thereof in a first direction orthogonal to the winding-center direction is longer than the outer size thereof in a second direction orthogonal to the winding-center direction and the first direction. Consequently, substantially plane sections 212, 212 are formed on the outer circumference of the electrode assembly 2.

The electrode assembly 2 includes a pair of straight sections 210, 210 extending straight on both sides of the winding center, a pair of turn sections 211, 211 which connects the pair of straight sections 210, 210 to each other and forms a circular arc shape. The outermost circumferential surface of each straight section 210 is a substantially plane section 212.

The turn sections 211, 211 correspond to the curved sections 200, 200 of the core 20. On the other hand, the straight sections 210, 210 correspond to the opposed sections 201, 201 of the core 20. Consequently, the substantially plane sections 212, 212 correspond to the opposed sections 201, 201 of the core 20.

The electrode assembly 2 is housed in the case 3 with the substantially plane sections 212, 212 facing the pair of mutually-opposed inner surfaces 302a, 302a of the case 3, respectively.

As illustrated in FIG. 3, the positive electrode plate 21b and the negative electrode plate 21c are stacked, while being displaced from each other in the winding-center direction. Consequently, a positive-electrode lead portion L in which only the positive electrode plate 21b is stacked is formed in a first end portion of the electrode assembly 2 in the winding-center direction. Likewise, a negative-electrode lead portion L in which only the negative electrode plate 21c is stacked is formed in a second end portion of the electrode assembly 2 in the winding-center direction. The straight sections 210, 210 in the first end portion of the electrode assembly 2 compose the positive-electrode lead portion L. Likewise, the straight sections 210, 210 in second end portion of the electrode assembly 2 compose the negative-electrode lead portion L.

The curved sections 200, 200 generate a repulsive force (restoring force for the curved sections to attempt to restore a straightened state) corresponding to the number of resin sheets S1 and S2 stacked. Accordingly, the separator 21a, the positive electrode plate 21b and the negative electrode plate 21c wound around the core 20 are in a state of being pushed outward by the action of the repulsive force of the curved sections 200, 200.

A current collector 5 includes a first portion 50 disposed along an end face of the electrode assembly 2, and a second portion 51 connected to one end of the first portion 50, so as to form a right angle or a substantially right angle with the first portion 50.

A through-hole H for a later-described axial fastening member 7 to be inserted through is formed in the second portion 51. The first portion 50 includes an insertion portion 500 insertable into the winding-center part of the electrode assembly 2. The insertion portion 500 is formed by twisting both sides of a slit provided in a metal plate composing the current collector 5 and extending in the longitudinal direction of the metal plate. A pair of insertion portions 500, 500 is provided so as to extend in the longitudinal direction, while being spaced from each other in a direction orthogonal to the longitudinal direction, and to extend out in that direction.

Clip members 52, 52 are attached to the lead portion L. Thus, the insertion portions 500, 500 are welded to the clip members 52, 52, while being interposed therebetween. Consequently, each current collector 5 is mechanically and electrically connected to the lead portion L of the electrode assembly 2 through the clip members 52, 52 (cf., FIG. 2). The electrode assembly 2, a pair of current collectors 5, 5, and a plurality of clip members 52, . . . are wrapped in an insulating bag B (cf., FIG. 6), and then housed in the case 3.

The case 3 is provided with a box-shaped case main body 30 in one surface of which an opening is formed, and a cover plate 31 for closing the opening of the case main body 30. Both the case main body 30 and the cover plate 31 are made of metal. By welding the cover plate 31 to the case main body 30, an internal space of the case 3 is formed to be airtight.

The case main body 30 is formed into a flat box shape. The case main body 30 can house the flat electrode assembly 2 in a tightly-fitted state. The case main body 30 includes a bottom portion 300 rectangular in plan view, a pair of sidewall portions 301, 301 rising from the two longitudinal-direction ends of the bottom portion 300, a pair of front and back wall portions 302, 302 rising from the two ends orthogonal to the longitudinal direction of the bottom portion 300. As the result of the adjacent sidewall portions 301, 301 and the front and back wall portions 302, 302 being connected to each other, there is formed an opening corresponding to the planar shape of the bottom portion 300.

The case main body 30 houses the electrode assembly 2, so that the longitudinal direction of the bottom portion 300 and the winding-center direction of the electrode assembly 2 are oriented in the same direction. The substantially plane sections 212, 212 of the housed electrode assembly 2 are located in proximity to or contact with the inner surfaces 302a, 302a of the front and back wall portions 302, 302.

Figure 5:
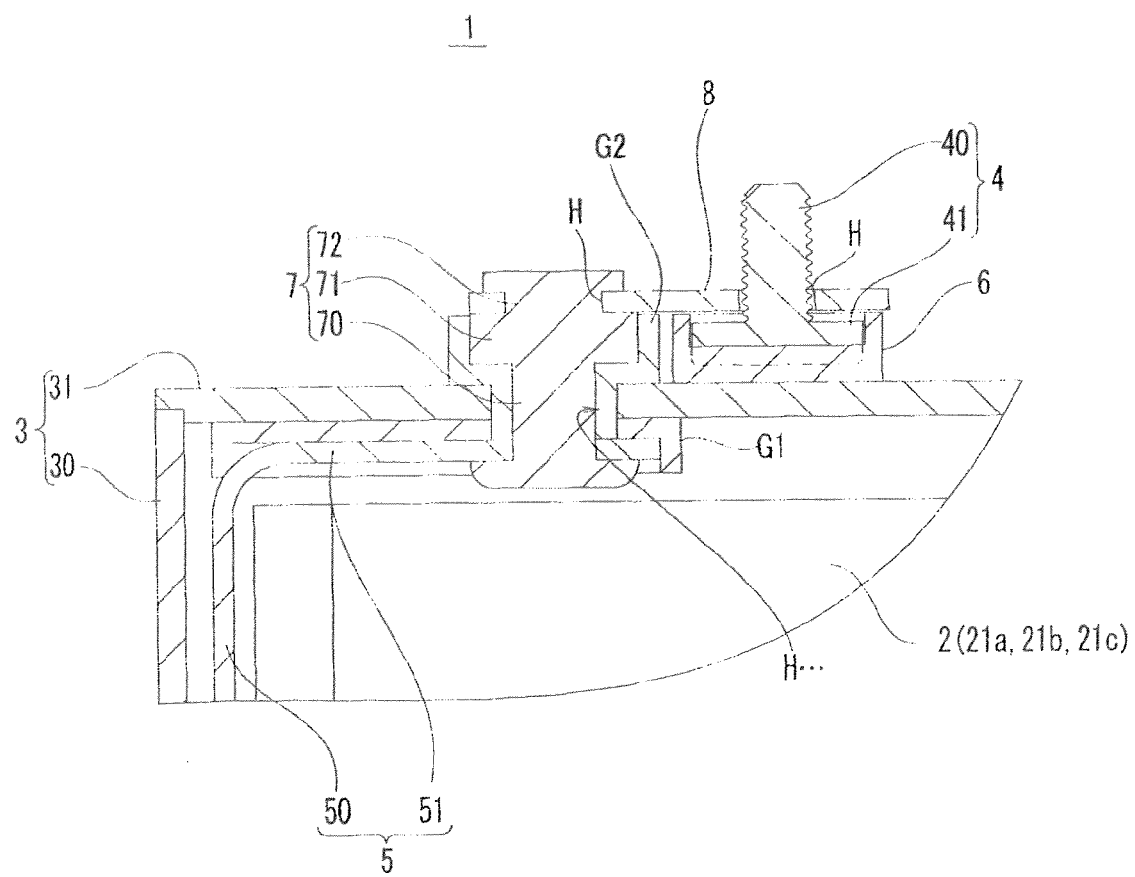
FIG. 5 is a partially enlarged cross-sectional view of the winding-type battery cell.

As illustrated in FIGS. 3 and 5, an output terminal 4 includes an axial terminal portion 40 and a body 41 connected to one end of the terminal portion 40. The output terminal 4 is a bolt terminal.

The body 41 is housed in a concave portion formed in an anti-rotation member 6 located on the cover plate 31. Consequently, the relative rotation of the output terminal 4 and the anti-rotation member 6 is restricted. The anti-rotation member 6 is a synthetic resin-molded part having electrical insulating properties.

Each current collector 5 is fixed within the case 3 and the electrode assembly 2 and each output terminal 4 are electrically connected to each other by a fastening member 7 inserted through the through-hole H of the cover plate 31.

Each fastening member 7 includes a first rivet portion 70 inserted through the cover plate 31 of the case 3 and the current collector 5, and a collar portion 71 connected to one end of the first rivet portion 70. In addition, the fastening member 7 includes a second rivet portion 72 on the opposite side of the first rivet portion 70.

There is provided a connecting fitting 8 for electrically connecting the fastening member 7 and the output terminal 4 to each other. The connecting fitting 8 is composed of a reed-shaped metal plate. The connecting fitting 8 includes a pair of through-holes H, H spaced from each other in the longitudinal direction of the connecting fitting. The terminal portion 40 of the output terminal 4 is inserted through one through-hole H of the connecting fitting 8. The second rivet portion 72 of the fastening member 7 is inserted through the other through-hole H of the connecting fitting 8.

A battery cell 1 is provided with an inner gasket G1 disposed along an inner surface of the cover plate 31 of the case 3, so as to adapt to the arrangement of the current collectors 5, 5, and an outer gasket G2 is disposed along an outer surface of the cover plate 31 of the case 3, so as to adapt to the arrangement of the current collector 5. A through-hole H for the first rivet portion 70 to be inserted through is formed in the inner gasket G1 and the outer gasket G2, respectively.

The first rivet portion 70 of the fastening member 7 is inserted through the outer gasket G2, the inner gasket G1, and the second portion 51 of a current collector 5a. In addition, a leading end of the first rivet portion 70 protruding inward from the second portion 51 is caulking-treated. The second rivet portion 72 of the fastening member 7 is inserted through the other through-hole H of the connecting fitting 8. In addition, a leading end of the second rivet portion 72 protruding outward from the connecting fitting 8 is caulking-treated.

Consequently, the current collectors 5, 5 are fixed to the case 3 and electrically connected to the fastening members 7, 7 and the connecting fittings 8, 8. In addition, as the result of the fastening members 7, 7 being caulking-treated, the inner gasket G1 and the outer gasket G2 are placed in pressure contact with inner and outer surfaces of the cover plate 31. Consequently, the interior of the case 3 is kept airtight.

Figure 6:
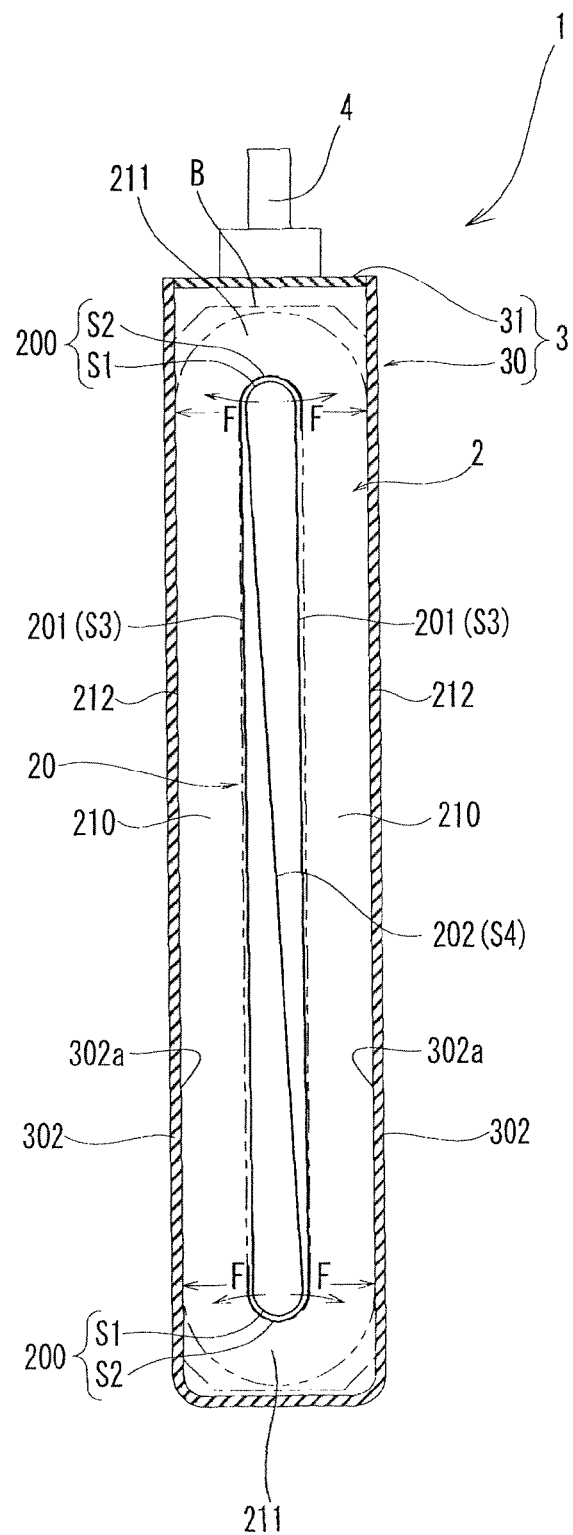
FIG. 6 is a cross-sectional side view of the winding-type battery cell.

The battery cell 1 according to the present embodiment is as described above. Each curved section 200 of the core 20 is composed of at least two-ply resin sheets S1 and S2 curved into a circular arc shape. Accordingly, as illustrated in FIG. 6, the curved section 200 generates a repulsive force F corresponding to the number of stacked resin sheets S1 and S2, Consequently, each curved section 200 pushes outward the separator 21a, the positive electrode plate 21b and the negative electrode plate 21c wound around the core 20.

That is, each curved section 200 of the core 20 exerts a pressure contact force on a pair of inner surfaces 302a, 302a, respectively. Consequently, an outer surface of the electrode assembly 2 (portions near both ends of each substantially plane section 212) is placed in a state of being pressed against the inner surfaces 302a, 302a of the case 3 from the winding center side.

Accordingly, close contact between an outer circumferential surface (portions near both end portions of each substantially plane section 212) of the electrode assembly 2 and the inner surfaces 302a, 302a of the case 3 is secured, and hence swaying or movement of the electrode assembly 2 is restricted, even if vibration or impact is applied to the battery cell 1.

In addition, the end portion of the outer resin sheet S2 in each curved section 200 generates a repulsive force F, so as to move away from the inner resin sheet S1 in the curved section 200. That is, the end portion of the outer resin sheet S2 in the curved section 200 generates a repulsive force F, in an attempt to rise. Consequently, the curved section 200 pushes the separator 21a, the positive electrode plate 21b, and the negative electrode plate 21c wound around the core 20 outward with a larger force.

Accordingly, the electrode assembly 2 is housed in the case 3 with a larger pressure contact force exerted on the inner surfaces 302a, 302a of the case 3. Consequently, close contact between the outer circumferential surface (portions near both end portions of each substantially plane section 212) of the electrode assembly 2 and the inner surfaces 302a, 302a of the case 3 is sufficiently secured, and hence swaying or movement of the electrode assembly 2 is more securely restricted, even if vibration or impact is applied to the battery cell Thus, according to the battery cell 1 of the present embodiment, the electrode assembly 2 does not sway or move even if excessive vibration or impact is applied, and therefore, it is possible to prevent the electrode assembly 2 from becoming damaged.

In addition, each opposed section 201 of the core 20 is composed of a single-piece resin sheet S3. Accordingly, the amount of resin sheet to occupy a space between the pair of curved sections 200, 200 is small, thereby securing a space to accommodate an electrolytic solution.

Yet additionally, the core 20 is formed by curving a single resin sheet S. Accordingly, the curved sections 200, 200, the opposed sections 201, 201 and the connecting section 202 are formed continuously in a seamless manner, thereby enhancing overall rigidity (strength).

It should be noted that the present invention is not limited to the above-described embodiment. It is therefore needless to say that modifications may be made, as appropriate, to the present invention without departing from the spirit and scope thereof.

In the above-described embodiment, a battery cell has been mentioned as one example of a winding-type electric storage device. The present invention is not limited to a battery cell, however. For example, the electric storage device may be a capacitor.

In the above-described embodiment, one electrode assembly 2 is housed in one case 3. The present invention is not limited to this configuration, however. For example, two or more electrode assemblies 2, . . . may be housed in the case 3. In this case, two or more electrode assemblies 2, . . . are disposed in a row, so that the substantially plane sections 212, 212 of adjacent electrode assemblies 2, 2 face each other in a state of being proximity to or contact with each other. In addition, each of two electrode assemblies 2, 2 positioned at both ends of the in-line electrode assemblies 2, . . . is arranged with one substantially plane section 212 placed in proximity to or contact with an inner surface 302a of the case 3. As the result of a repulsive force generated by the core 20 of each of the two electrode assemblies 2, 2 positioned at the both ends acting upon the inner surface 302a of the case 3, the two or more electrode assemblies 2, . . . arranged within the case 3 are prevented from swaying or moving.

In the above-described embodiment, each curved section 200 is composed of two-ply resin sheets S1 and S2. The embodiment is not limited to this configuration, however. The curved section 200 may be composed of, for example, resin sheets of three or more plies.

In the above-described embodiment, the core 20 is formed by curving one resin sheet S. The embodiment is not limited to this configuration, however. For example, the curved sections 200, 200, the opposed sections 201, 201 and the connecting section 202 may be formed by splicing a plurality of resin sheets.

In addition, various forms may be employed for the core 20. For example, as illustrated in FIG. 7A, the core 20 may be formed as the result of one resin sheet being formed into a cylindrical shape, the inner resin sheet S1 and each opposed section 201 in each curved section 200 being made continuous, an independent resin sheet to serve as the outer resin sheet S2 being superposed on a portion to serve as the inner resin sheet S1 in the curved section 200, and the inner resin sheet S1 and the outer resin sheet S2 being connected to each other.

Alternatively, it is possible to employ a form opposite to the form illustrated in FIG. 7A. That is, the core 20 may be formed as the result of one resin sheet being formed into a cylindrical shape, the outer resin sheet S2 and each opposed section 201 in each curved section 200 being made continuous, an independent resin sheet to serve as the inner resin sheet S1 being superposed on a portion to serve as the outer resin sheet S2 in the curved section 200, and the inner resin sheet S1 and the outer resin sheet S2 being connected to each other.

Yet alternatively, as illustrated in FIG. 7B, the core 20 may be formed as the result of each end portion of one of two resin sheets serving as the inner resin sheet S1 in the curved section 200, a middle portion of the one resin sheet serving as the first opposed section 201, each end portion of the other resin sheet serving as the outer resin sheet S2 in the curved section 200, a middle portion of the other resin sheet serving as the second opposed section 201, an end portion of the other curved resin sheet being superposed on an outer circumference of the end portion of one curved resin sheet, and the end portions of the two resin sheet being connected to each other.

Still alternatively, as illustrated in FIG. 7C, the core 20 may be formed as the result of one of two resin sheets serving as the first opposed section 201, respective end portions of the other resin sheet (double or more-folded respective end portions) serving as the inner resin sheet S1 and the outer resin sheet S2 in the curved section 200, and a middle portion of the other resin sheet serving as the second opposed section 201.

Still alternatively, as illustrated in FIG. 7D, the core 20 may be formed as the result of one resin sheet being made annular by connecting the second end portion of the resin sheet to a halfway location of the first end portion of the resin sheet so as to leave a margin in the first end portion, a portion of two or more plies formed by folding the first end portion of the resin sheet a plural number of times serving as the first curved section 200, and a portion of two or more plies formed by folding the halfway location of the annular resin sheet a plural number of times serving as the second curved section 200.

Figure 8A:
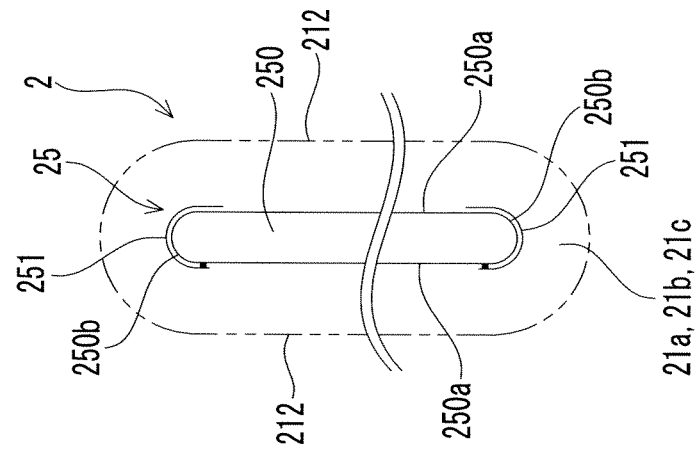
FIG. 8 is a schematic side view of a core according to yet another embodiment of the present invention.
Figure 8B:
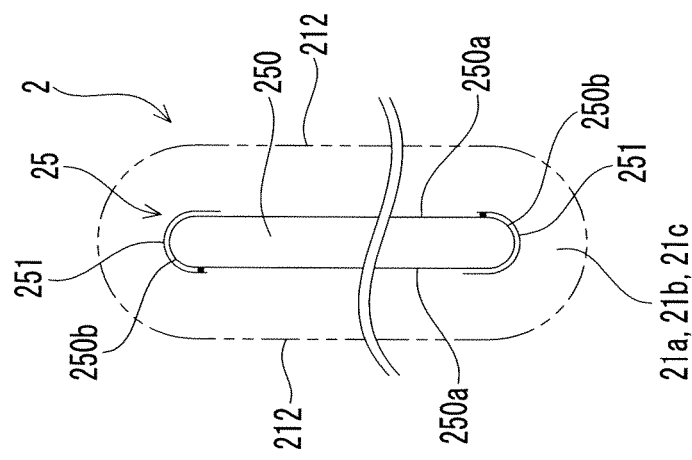

In the above-described embodiment, the core 20 is formed by curving one resin sheet S. The embodiment is not limited to this configuration, however. For example, as illustrated in FIGS. 8A and 8B, a core 25 is provided with a Out core body 250, and a slat 251 a first end of which is fixed to the core body 250. The core body 250 is a plate-shaped core having a predetermined thickness, and is a solid-core member. Each end portion of the core body 250 is formed into a circular arc shape. Accordingly, the core body 250 includes front and back plane surfaces 250a, 250a between a first end portion and a second end portion of the core body 250, and curved end faces 250b, 250b at the respective end portions. The first end of the slat 251 is fixed to a boundary, or a vicinity thereof, between the plane surfaces 250a, 250a and the curved end faces 250b, 250b. A second end of the slat 251 is a free end. In addition, the slat 251 is formed so as to be equal to or greater in circular arc length than the curved end faces 250b, 250b. Accordingly, the slat 251, when curved along each curved end face 250b, can cover the curved end face 250b. In addition, a second end-side end portion of the slat 251 generates a repulsive force, so as to move away from the curved end face 250b. That is, the second end-side end portion of the slat 251 generates a repulsive force, in an attempt to rise. Consequently, the slat 251 pushes the separator 21a, the positive electrode plate 21b, and the negative electrode plate 21c wound around the core 25 outward with a larger force.

In the above-described embodiment, the electrode assembly 2 and the current collectors 5, 5 are wrapped in the insulating bag B, and then housed in the case 3. The embodiment is not limited to this configuration, however. For example, the insulating bag B may not be necessary if the inner surfaces 302a, 302a of the case 3 have electrical insulating properties.

The invention claimed is:

1. A winding-type electric storage device comprising:
   a flat electrode assembly including a core; and
   a case in which the electrode assembly is housed,
   the core including:
      first and second curved sections which are disposed so that the inner circumferential surfaces thereof face to each other and each of which has a first end and a second end; and
      first and second opposed sections which connect the mutually-opposed first ends and second ends of the first and second curved sections to each other and are opposed to each other,
   the electrode assembly including, on the outer circumference thereof, substantially plane sections respectively corresponding to the opposed sections of the core,
   the substantially plane sections being in proximity to or contact with an inner surface of the case,
   wherein each of the first and second curved sections is at least in part composed of a material stacked into two or more plies, an outer ply of the plies comprising:
      a fixed end which is fixed to an inner ply of the plies; and
      a free end which is not fixed to the inner ply, and is disposed over an opposed section of the first and second opposed sections, and
   wherein the outer ply is curved in a circular arc shape over a distance from the first end to the second end of a curved section of the first and second curved sections, the free end is located at a position in proximity to a boundary between the curved section and the opposed section, and the outer ply is elastically deformed so as to generate a repulsive force exerted outward from a center of the circular arc shape.

2. The winding-type electric storage device according to claim 1, wherein each of the first and second opposed sections is at least in part thinner than the curved sections.

3. The winding-type electric storage device according to claim 2, wherein each of the first and second opposed sections is at least in part composed of a single-ply material.

4. The winding-type electric storage device according to claim 1, wherein the core further comprises a connecting section for connecting the first end of the first curved section and the second end of the second curved section to each other.

5. The winding-type electric storage device according to claim 4, wherein:
   each of the first and second curved sections is composed of the material stacked into two plies;
   each of the first and second opposed sections is composed of a single-ply material;
   the connecting section is composed of a single-ply material;
   the first opposed section connects a first end of the outer ply in the first curved section and a first end of an inner ply in the second curved section to each other;
   the second opposed section connects a second end of an inner ply in the first curved section and a second end of the outer ply in the second curved section to each other; and
   the connecting section connects a first end of the inner material in the first curved section and a second end of the inner material in the second curved section to each other.

6. The winding-type electric storage device according to claim 5, wherein a second end of the outer ply in the first curved section comprises the free end, and the outer ply in the first curved section comprises a slat.

7. The winding-type electric storage device according to claim 6, wherein a first end of the outer ply in the second curved section comprises the free end, and the outer ply in the second curved section comprises a slat.

8. The winding-type electric storage device according to claim 5, wherein:
   a boundary, or a vicinity thereof, between the inner ply in the first curved section and the connecting section is joined to a boundary, or a vicinity thereof, between the first opposed section and the outer ply in the first curved section; and
   a boundary, or a vicinity thereof, between the inner ply in the second curved section and the connecting section is joined to a boundary, or a vicinity thereof, between the second opposed section and the outer ply in the second curved section.

9. The winding-type electric storage device according to claim 8, wherein the joining is made by means of welding.

10. The winding-type electric storage device according to claim 4, wherein the first and second curved sections, the first and second opposed sections, and the connecting section are formed by curving a single-ply sheet-shaped material.

11. The winding-type electric storage device according to claim 1, wherein the material comprises a sheet-shaped material.

12. The winding-type electric storage device according to claim 1, wherein:
   one of a first end and a second end of the outer ply in the first curved section comprises the fixed end;
   the other one of the first end and second end of the outer ply in the first curved section comprises the free end; and
   the outer material in the first curved section comprises a slat.

13. The winding-type electric storage device according to claim 12, wherein:
   one of a first end and a second end of the outer ply in the second curved section comprises the fixed end;
   the other one of the first end and second end of the outer ply in the second curved section comprises the free end; and
   the outer ply in the second curved section comprises a slat.

14. The winding-type electric storage device according to claim 1, wherein the material comprises a resin.

15. The winding-type electric storage device according to claim 14, wherein the material comprises a resin sheet.

16. The winding-type electric storage device according to claim 1, wherein the electrode assembly includes a positive electrode plate and a negative electrode plate stacked with a separator held therebetween and wound around the core.

17. The winding-type electric storage device according to claim 1, wherein the free end of the outer ply is formed between a substantially plane section of the substantially plane sections of the electrode assembly and the opposed section of the first and second opposed sections.

18. The winding-type electric storage device according to claim 1, wherein the electrode assembly includes a positive and negative electrode plates which are wound around the core, and a separator formed between the positive and negative electrode plates, and the free end of the outer ply exerts a repulsive force on the positive and negative electrode plates and the separator such that the positive and negative electrode plates and the separator are pushed outward away from the core.

19. The winding-type electric storage device according to claim 1, wherein the outer ply is welded to the inner ply at a center portion of the curved section.

20. A winding-type electric storage device comprising:
   a flat electrode assembly including a core; and
   a case in which the electrode assembly is housed,
   the core including:
      a flat core body having a curved end face at an end portion thereof, and a straight section connected to the curved end face; and
      a slat disposed so as to be able to cover the curved end face and including:
         a fixed end fixed to the core body; and
         a free end on the opposite side of the fixed end and disposed over the straight section of the flat core body,
      wherein the slat is curved in a circular arc shape over a distance from a first end to a second end of the curved end face, the free end is located at a position in proximity to a boundary between the curved end face and the straight section, and the slat is elastically deformed so as to generate a repulsive force exerted outward from a center of the circular arc shape.

21. The winding-type electric storage device according to claim 20, wherein the curved end face comprises a circular arc surface.

22. The winding-type electric storage device according to claim 20, wherein the slat includes:
   a first slat disposed so as to be able to cover the curved end face of a first end portion of the core body; and
   a second slat disposed so as to be able to cover the curved end face of a second end portion of the core body.

23. The winding-type electric storage device according to claim 20, wherein the slat is welded to the curved end face at a center portion of the curved end face.

* * * * *